United States Patent [19]

Jorgensen et al.

[11] 4,178,468
[45] Dec. 11, 1979

[54] DUCT POST

[75] Inventors: George N. Jorgensen; Stephen L. Flee; James C. Carroll, all of Oxford, Ohio

[73] Assignee: Square D Company, Palatine, Ill.

[21] Appl. No.: 793,685

[22] Filed: May 4, 1977

[51] Int. Cl.² .............................................. H02G 3/04
[52] U.S. Cl. ...................................... 174/48; 220/3.8; 220/331
[58] Field of Search ............................ 174/48, 49, 66; 220/3.8, 241, 242, 329, 331; 52/220, 221

[56] References Cited

U.S. PATENT DOCUMENTS

| | | | |
|---|---|---|---|
| 1,462,578 | 7/1923 | Kashinsky | 220/331 X |
| 2,808,135 | 10/1957 | Moran | 138/157 |
| 3,609,211 | 9/1971 | Van Herk | 174/49 |
| 3,823,251 | 7/1974 | Heithecker et al. | 174/48 |
| 3,888,282 | 6/1975 | Liddall | 174/48 X |
| 3,889,044 | 6/1975 | Flachbarth et al. | 174/48 |
| 4,092,486 | 5/1978 | Myers | 174/48 |

Primary Examiner—Bruce A. Reynolds
Assistant Examiner—David A. Tone
Attorney, Agent, or Firm—Larry I. Golden; Norton Lesser; Richard T. Guttman

[57] ABSTRACT

The following specification describes a feeder duct post assembly including a conduit for extending electrical connections from above a suspended ceiling to an outlet receptacle located between a pair of spaced barrier walls in the post. An upper wall on the conduit forms a lower wall of a junction box at the upper end of the post and defines a passage for extending communication wiring through the post to an outlet passage located above the outlet receptacle and barrier walls. The junction box has a cover movable between an open and closed positions, while retained on the box to enable wiring of the junction box. A boot on the lower end of the post optionally receives a plate having prongs to secure the post to carpeting or receives a pad or plate having an adhesive coat to secure the post to smooth flooring.

10 Claims, 10 Drawing Figures

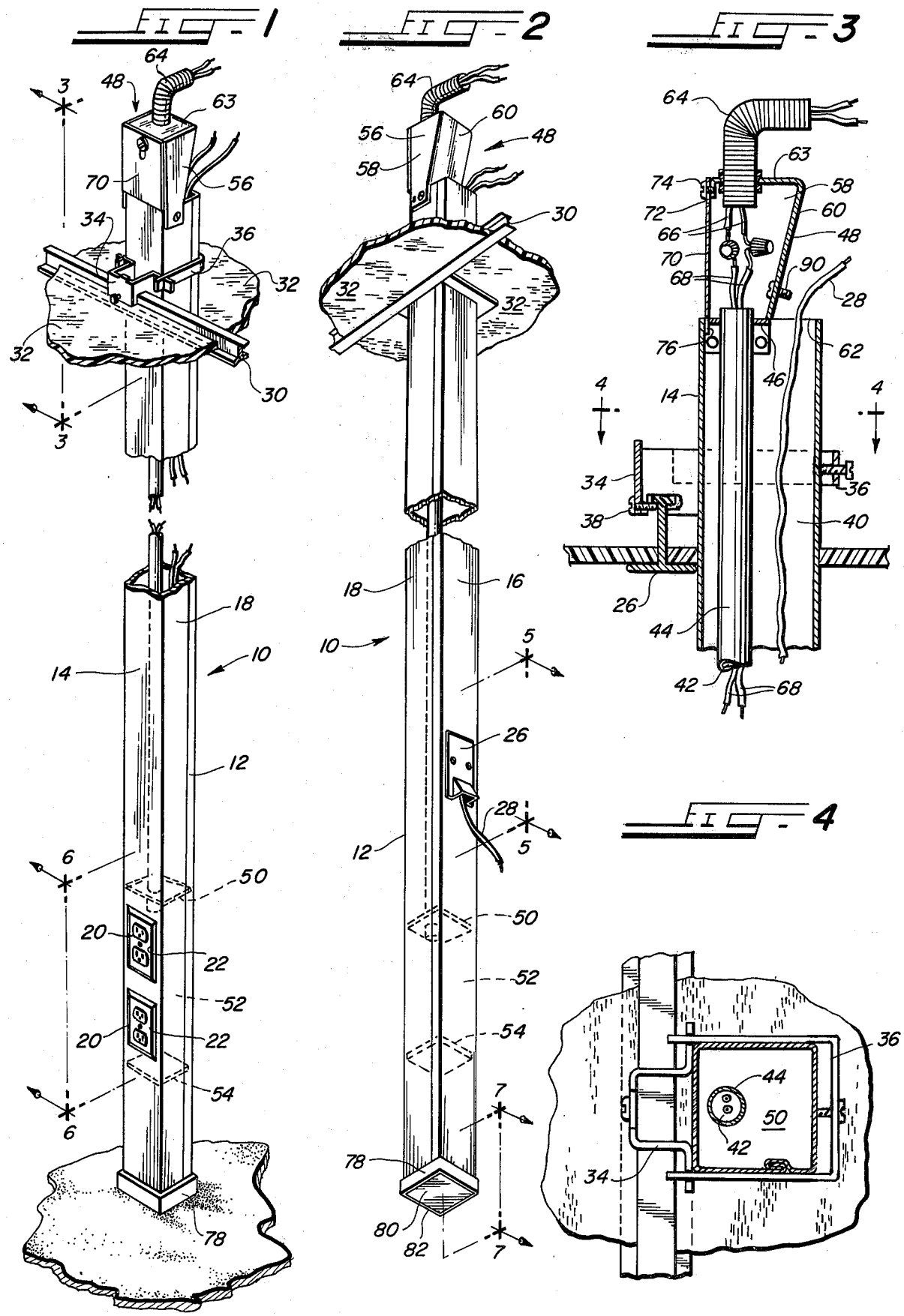

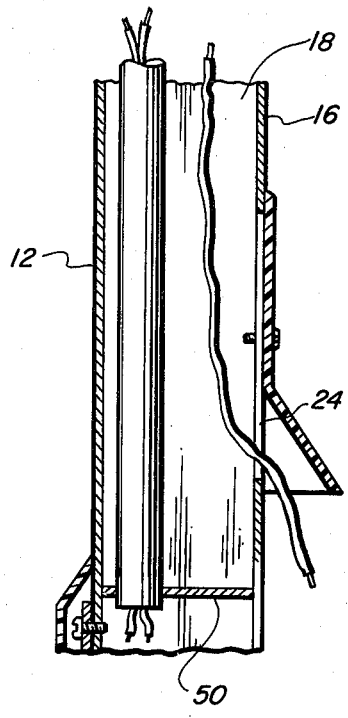
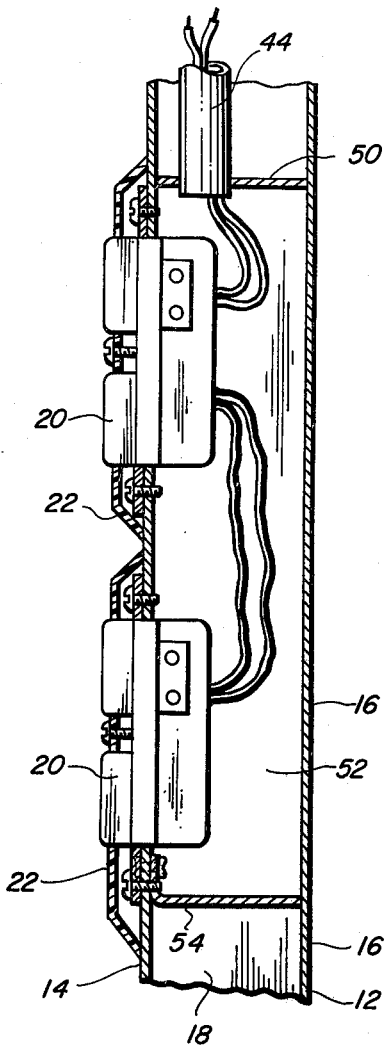
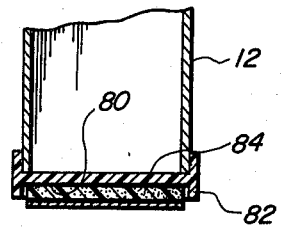
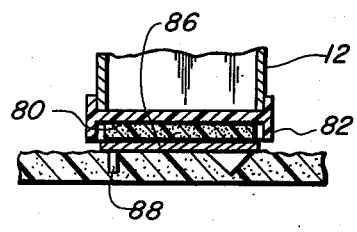
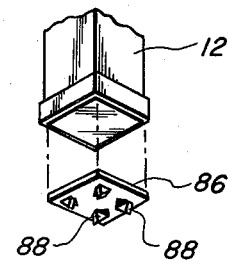
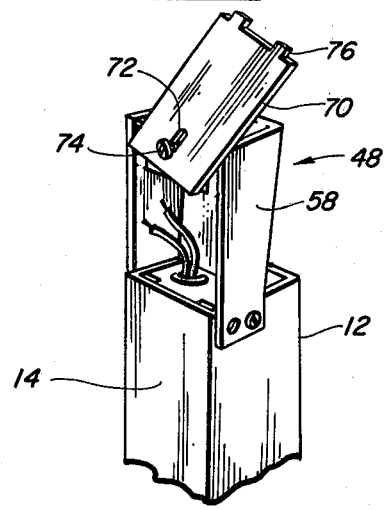

DUCT POST

BACKGROUND OF THE INVENTION

1. Field of the Invention

This invention relates in general to interior multi service electrical feeder ducts and more particularly to an improved and/or more economical feeder duct post assembly for extending electrical power and communication connections from above a suspended ceiling to a position intermediate the suspended ceiling and floor.

2. Summary of the Prior Art

In many large interior areas utilizing a ceiling feeder system, hollow columns or duct posts are provided at spaced positions for supplying both electrical power and communication service. The posts are usually detachably supported at their upper ends by a device for clamping the post to a ceiling rail. The ceiling rail supports acoustical tile, grilles or other material forming a suspended ceiling and a junction box at the upper end of the post projects above the rail and suspended ceiling to provide an electrical power connection to a receptacle outlet carried at a convenient height by the post. The post is usually divided into two compartments by a longitudinally extending interior wall with the electrical power connections fed through one compartment and communication wiring fed through the other compartment and extended through a post opening at the opposite side of the post from the outlet receptacle for connection to such apparatus as a telephone.

The problems with the described feeder duct arrangement include the necessity to provide the longitudinally extending wall defining the separate compartments, the need to remove and replace the cover of the junction box in order to complete an electrical connection therethrough; the difficulty in providing an outlet box or isolating arrangement for the outlet receptacle and the difficulty in securing the bottom of the post to flooring material of different types such as tile or carpeting.

SUMMARY OF THE INVENTION

The present invention proposes several important improvements in feeder duct posts of the described character through the provision of a conduit between the junction box and outlet to define the two compartments, a pivotable cover for the junction box to provide access to the box without removal of the cover and the provision of a recessed boot at the foot of the post for optionally receiving a carpet or tile adapter plate to secure the post respectively to either a carpet or to a smooth material such as tile.

The conduit passes through horizontal plates at its upper and lower ends with the upper plate forming the lower wall of the junction box and the lower plate forming the upper wall of an outlet box for the outlet receptacle. The upper plate is sized to permit the facile introduction of communication wiring into the post between the post wall and conduit. A horizontal wall below the receptacle completes the outlet box for the receptacle. An opening in the post wall opposite the receptacle and above the upper outlet box wall provides an outlet passage for communication wiring passing between the post and the conduit.

The junction box is formed by a strap member secured to the upper end of the post and extending above the upper plate of the conduit. The cover for the box is secured at its upper end to the upper end of the strap member by means of a screw passsing through a slot. The slot permits the cover to be lifted for disengaging a pair of lugs from between the post and the upper plate of conduit so that the cover can then be rotated to one side. This frees the electrician to use both hands for completing the circuits to the junction box without having to totally remove and safely store the cover.

To secure the post to the floor the bottom of the post is provided with a boot or cover having a recess. If the floor is smooth, a sponge rubber plate or foam pad having an adhesive coat on opposite surfaces is fitted in the boot recess to hold the post against movement. If the post is engaged with a carpet, an adapter plate having projecting prongs or tabs is fitted in the recess or to an adhesive pad in the recess. The prongs hold the plate from moving relative the carpet and either the wall of the boot recess or the adhesive pad holds the post from moving relative the adapter plate and carpet.

It is therefore an object of the present invention to provide an improved and/or more economical feeder duct post assembly for enabling the provision of electrical power and communication wiring to a selected position.

Other objects and features of the present invention will become apparent on examination of the following specification and claims together with the accompanying drawings.

BRIEF DESCRIPTION OF THE DRAWINGS

FIG. 1 is an isometric view illustrating the front of a feeder post assembly incorporating the principles of the present invention.

FIG. 2 is an isometric view illustrating the rear of a feeder post assembly incorporating the principles of the present invention.

FIG. 3 is a sectional view taken generally along the line 3—3 in FIG. 1.

FIG. 4 is a sectional view taken generally along the line 4—4 in FIG. 3.

FIG. 5 is a sectional view taken generally along the line 5—5 in FIG. 2.

FIG. 6 is a sectional view taken generally along the line 6—6 in FIG. 1.

FIG. 7 is a sectional view taken generally along the line 7—7 in FIG. 2.

FIG. 8 is a sectional view illustrating a carpet plate adapter assembled to the post.

FIG. 9 is an exploded partial isometric view of the carpet plate adapters and post boot; and FIG. 10 illustrates the cover of the junction box in an open position.

DESCRIPTION OF THE PREFERRED EMBODIMENT

In FIGS. 1 and 2 of the drawings a multi-service feeder duct post assembly is indicated generally by the reference character 10. The post assembly 10 is formed by a non-circular annular or hollow sheet metal channel or post 12 closed by a conventional sheet metal lock and defined by spaced parallel front and rear walls 14 and 16 and spaced parallel side walls 18. The post 12 is thus in the form of a parallelepiped preferably square with the front wall 14 having a pair of spaced openings in which a respective electrical power outlet receptacle 20 is conventionally secured together with respective face plates 22 at a convenient position intermediate the post ends. The rear wall 16 is provided with an opening or outlet passage 24 as best seen in FIG. 5 at a position above the outlet receptacle 20 and over which a conventional cover plate 26 is secured for passing telephone or other communication wiring indicated generally at 28.

The post 12 is secured adjacent the upper end thereof to a T rail 30 supporting portions 32 of a suspended ceiling. The post 12 is secured to T rail 30 by means of a U shaped T bar clamp 34 and a U shaped T bar strap 36 which sandwich the T bar 30 and the post 12 therebetween as best seen in FIG. 3 above the ceiling portions 32 to secure the post 12 to the rail 30. The end legs of the clamp 34 and strap 36 have conventional recesses to nestingly receive each others end legs and interlock the same about the post. The clamp 34 is provided with a recess in the lower edge of each side leg to receive the upper horizontal lug on the vertical bar of the T rail and a lip on each side clamp leg recess interlocks with the upper horizontal lug in response to the threading of member 38 through back leg of the clamp 34 and against the vertical bar of the T rail. This secures the post firmly against an edge of the T rail. If desired a screw passing through a slot in the back leg of strap 36 may also be used to further secure the strap to the post. A trim plate may also be provided directly around the wall of the post projecting through the ceiling portion to disguise the opening passing the post through the ceiling portion.

The post 12 as mentioned is hollow and internally is divided into compartments 40 and 42 with compartment 42 defined by the interior of a conduit 44 and the compartment 40 defined by the space between the conduit 44 and the walls 14, 16 and 18. The conduit 44 extends parallel to the axis of the post and at the upper end of the post passes through a plate 46 forming the lower wall of a junction box 48. At the lower end of the conduit 44 it passes through a plate 50 forming the upper or barrier wall of an outlet box 52 whose lower wall or barrier is formed by a lower plate 54. Wall 50 is spaced above the receptacles 20 and wall 54 is spaced below the outlets or receptacles 20 to form with the post wall an outlet box communicating only with the conduit compartment 42. Walls or plates 46 and 50 may be secured to conduit 44 by force fit; appropriate fittings or flaring the conduit ends and/or the walls 46 and 50 may also be secured to one of the post walls. Wall 54 is conventionally secured to the post wall 14 by passing a rivet through a bend on wall 54, as seen in FIG. 6.

The box 48 further includes a U shaped strap member 56 having tabs on the side legs 58 overlappingly secured to the side walls 18 of the post adjacent the upper end. A back leg 60 on the member 56 slopes rearwardly from the rear edge of plate 46, whose rear edge is spaced intermediate the planes of the front and rear post walls 14 and 16 to define a passage 62. Passage 62 enables the facile passage of wiring 28 into compartment 40 since such wiring may comprise relatively large cables having attached connectors to facilitate connections to either telephones, switchboards or computer terminals, for example.

The back wall 60 of box 48 is provided with a projecting end which is folded over to form a top wall 63 for the box. Wall 63 and/or one of the other junction box walls is provided with a knockout or passage for passing and securing a conduit 64 located above the suspended ceiling portions 32. The conduit 64 of course houses wires 66, which extend an electrical connection from a power source to the outlets 20, through wires 68, which are factory assembled in conduit 42 and connected to outlets 20. To facilitate the establishment of the connection between wires 66 and 68, the box 48 is provided with a faciley movable retained front cover 70 while the rearward slope of wall 60 provides sufficient volume in the box 48 to receive the conduit and wire ends together with connecting wire nuts.

The cover 70 has an elongated slot 72 adjacent the upper end through which a screw or securing means 74 passes for threading into a bent over front tab on wall 63 for securing the cover 70 to the box 48. The bottom edge of the cover 70 is provided with a pair of spaced lugs 76, which fit into or engage between the inner surface of wall 14 and the front edge of plate or wall 46 to secure the cover against rotational or outward movement.

The bottom end of the post 12 is provided with a plastic boot 78 which is friction fit for example over the walls 14, 16 and 18 or otherwise secured to the bottom post end. A non circular or square recess 80 defined by a peripheral rim wall 82 is provided on the boot. The recess 80 receives a correspondingly shaped one of adapter plates or pads 84 or 86. Plate or pad 84 is of sponge rubber or foam, for example, having an adhesive coat on opposite surfaces protected by a paper sheet and when the sheet is removed the pad placed in the recess 80, the pad adhesively secures the bottom end of the post to a smooth floor formed for example by an asphalt or vinyl tile. Alternatively plate 86 fitted in recess 80 has projecting prongs 88 thereon to engage a carpet and thus serves to lock the post to a carpet on the floor. It will be appreciated that the plate 86 may if desired also be adhesively secured to a pad 84 in the recess 80.

As already indicated the post assembly 10 is factory assembled with the conduit 44 having wires 68 connected to the outlet receptacles 20 and free ends located in junction box 48. Walls or plates 50 and 54 together with the post walls form an outlet box to prevent inadvertent contact with the stripped ends of wires 68 or the free passage of air. Wall 54 is secured to the post wall by means of an L shaped tang with the rivet or other securing means camouflaged by the outlet face plates 22. Wall 46 may be secured by the same screws securing strap member 56 and thereby serve to secure the conduit 44 and the attached plate 50.

To install the post assembly the boot 78 and an appropriate pad 84 with or without plate 86 are first assembled thereto depending on the nature of the floor and engaged with the floor. The post is then secured to the T rail by the strap 36 and clamp 34, with the pad 84 and/or 86 placed under some compression. The communication wiring 28 is supplied through the passage 62 for exit through the cover plate 26 either before or after wires 68 are connected to wires 66. A connector usually provided at the end of wiring 28 is secured either to the post or to some other support to hold the wiring 28 immobile and from chafing against the edge of opening 24. The cover plate 26 may be reversed from the position shown to introduce a bend in the wiring 28 for strain relief and to avoid contact with a metal edge of the post, if deemed desirable.

For ease in connecting the wires 66 and 68, since the electrician will usually be standing on a ladder, the screw 74 holding cover plate 70 is loosened. The cover 70 may now be lifted along the axis of slot 73 to disengage lugs 76 from between walls 14 and 46 and the cover rotated to provide access to the box 48. The cover may be secured in the rotated or offset position by tightening the screw 74 or allowed to engage one of the side walls of the post. The conduit 64 may now be easily assembled to the box 48 and the wires 66 and 68 appropriately connected by wire nuts for example. A ground wire may also be conventionally connected to the grounding screw 90 in the box. The cover 70 is then rotated back in alignment with legs 58 and the lugs 76 engaged between walls 14 and 46 to close the box. Thus it is not necessary to disengage the cover totally from the box and find a convenient safe placement therefor.

The foregoing is a description of an improved feeder duct post assembly whose inventive concepts are believed set forth in the accompanying claims.

We claim:

1. A feeder duct post assembly including a power outlet receptacle, said assembly having securing means adjacent one end adapted to detachably secure said assembly to a ceiling rail and said assembly having engaging means at an opposite end adapted to engage a floor, the improvement comprising:
    an integrally formed closed annular sheet metal post having a longitudinal axis and including an open top end and an open bottom end, said post carrying said receptacle at a position spaced intermediate said top end and said bottom end,
    an integrally formed, closed, cylindrical conduit, substantially smaller in cross section than said receptacle, within said post extending parallel to the longitudinal axis of said post and defining a first compartment within said conduit adapted to extend a power line, said conduit extending from the top end of said post to a position adjacent said receptacle, said post and said conduit defining a second compartment therebetween adapted to extend a communication line therethrough;
    a pair of spaced apart barrier walls in said post, each of said barrier walls extending transverse to said post axis, and spanning the cross section of said post, one of said barrier walls spaced intermediate said receptacle and said top end of said post and the other barrier wall spaced intermediate said receptacle and said bottom end of said post, said barrier walls and the portion of said post intermediate said pair of barrier walls forming an outlet box for said receptacle, said receptacle being located in said outlet box and external to said first and second compartments;
    a passage in the portion of said post forming said outlet box aligned with said receptacle to enable access to said receptacle;
    a barrier wall passage in said one barrier wall passing said conduit through said one barrier wall with said passage having an edge in close fitting encircling engagement with said conduit and thereby inhibiting communication between said outlet box and said second compartment, said barrier wall passage adapted to pass a power line into said outlet box for connection to said receptacle; and
    a first communication passage in said post intermediate said one barrier wall and said top end of said post adapted to receive a telephone-type connector and an attached plurality of communication wires for extending said communication wires from said second compartment.

2. In the assembly claimed in claim 1, a junction box adjacent said top end of said post for enabling the extension of a connection from an electrical power source above said ceiling rail through said conduit to said receptacle.

3. In the assembly claimed in claim 2, a cover for said junction box rotatable into an open position for enabling access to said junction box and rotatable into a closed position to prevent access to said junction box.

4. In the assembly claimed in claim 3, a second communication passage defined by said junction box and said post, said second communication passage in communication with the top end of said post and adapted for enabling the insertion of said connector and said communication wires between said post and said conduit.

5. The assembly claimed in claim 1, wherein said engaging means adapted to engage a floor includes a boot frictionally secured in encircling relationship to the bottom end of said post, said boot including a boot wall spanning the bottom end of said post, said boot having a noncircular rim wall extending about the perimeter of said boot wall and projecting therefrom to define a noncircular recess, and
    a plate means for engaging said floor, said plate means engaging said boot wall and having a shape corresponding to said noncircular recess for receipt therein.

6. The duct assembly claimed in claim 5 in which said plate means includes prongs.

7. The assembly claimed in claim 5, wherein said plate means includes an adhesive coat adapted for use in securing said bottom end of the post to a smooth floor.

8. The assembly claimed in claim 5, wherein said plate means includes projecting prongs adapted for use in securing said bottom end of the post to a carpet floor.

9. A feeder duct post assembly including a power outlet receptacle, said assembly having securing means adjacent one end adapted to detachably secure said assembly to a ceiling rail and said assembly having engaging means at an opposite end adapted to engage a floor, the improvement comprising:
    an annular post having a longitudinal post axis, and including a top end and a bottom end, said post carrying said receptacle at a position spaced intermediate opposite ends of said post;
    a conduit in said post extending parallel to the post axis; p1 a pair of spaced apart barrier walls in said post, each of said barrier walls extending transverse to said post axis, one of said barrier walls spaced intermediate said receptacle and said top end of said post and passing said conduit and the other barrier wall spaced intermediate said receptacle and said bottom end of said post;
    a junction box adjacent said top end of said post for enabling the extension of a connection from an electrical power source above said ceiling rail through said conduit to said receptacle;
    a cover for said junction box having a perimeter and also having a vertical elongate slot surrounded by said perimeter,
    lug means on said cover engaged between said box and said post for holding said cover in a position preventing rotation of said cover, and
    axially movable pivot means extending through said slot into said box for attaching said cover to said box and for forming a pivot for said cover, whereby said cover may be fully supported by said pivot means, said slot enabling disengagement of said lug means from between said box and said post to enable rotation of said cover about the axis of said pivot means in response to movement of said pviot means in one axial direction with said cover retained attached to said box by said pivot means.

10. The assembly claimed in claim 8 in which said annular post has a plurality of walls defining a generally square shaped perimeter and said junction box has a lower wall wholly within said perimeter and spaced from one of said walls by a distance sufficient to define a passage adapted to receive a telephone-type connector and an attached plurality of communication wires.

* * * * *

UNITED STATES PATENT AND TRADEMARK OFFICE
CERTIFICATE OF CORRECTION

PATENT NO. : 4,178,468

DATED : December 11, 1979

INVENTOR(S) : G. N. Jorgensen, S.L. Flee and J. C. Carroll

It is certified that error appears in the above-identified patent and that said Letters Patent are hereby corrected as shown below:

Column 4, line 65, "slot 73" should be --slot 72--;

Column 6, line 44, delete "pl".

Signed and Sealed this

Twenty-second Day of July 1980

[SEAL]

Attest:

SIDNEY A. DIAMOND

Attesting Officer     Commissioner of Patents and Trademarks